(12) United States Patent
Rodrigues et al.

(10) Patent No.: US 7,875,359 B2
(45) Date of Patent: Jan. 25, 2011

(54) OPACIFYING POLYMERS

(75) Inventors: Klein A. Rodrigues, Signal Mountain, TN (US); Darin K. Griffith, Chattanooga, TN (US)

(73) Assignee: Akzo Nobel N.V. (NL)

( * ) Notice: Subject to any disclaimer, the term of this patent is extended or adjusted under 35 U.S.C. 154(b) by 664 days.

(21) Appl. No.: 11/035,160

(22) Filed: Jan. 13, 2005

(65) Prior Publication Data

US 2006/0154088 A1 Jul. 13, 2006

(51) Int. Cl.
  *B32B 27/30* (2006.01)
  *B32B 27/00* (2006.01)
  *C08F 120/00* (2006.01)

(52) U.S. Cl. ............ 428/461; 428/500; 526/317.1; 526/319; 526/328; 526/328.5

(58) Field of Classification Search .......... 526/328, 526/328.5, 317.1, 319; 428/437, 461, 500
See application file for complete search history.

(56) References Cited

U.S. PATENT DOCUMENTS

| | | | |
|---|---|---|---|
| 3,661,827 A | 5/1972 | Taft | |
| 4,017,476 A | 4/1977 | Murray et al. | |
| 4,271,030 A | 6/1981 | Brierley et al. | |
| 4,457,855 A | 7/1984 | Sudbury et al. | |
| 4,474,677 A | 10/1984 | Foxlee | |
| 4,486,237 A | 12/1984 | Paffoni et al. | |
| 4,623,476 A | 11/1986 | Nayar et al. | |
| 4,708,816 A | 11/1987 | Chang et al. | |
| 4,714,562 A | 12/1987 | Roselle et al. | |
| 4,917,814 A | 4/1990 | MacIntyre et al. | |
| 4,931,207 A | 6/1990 | Cramer et al. | |
| 4,952,333 A | 8/1990 | Cramer | |
| 5,089,162 A | 2/1992 | Rapisarda et al. | |
| 5,104,571 A | 4/1992 | Cramer | |
| 5,106,421 A | 4/1992 | Marshall, Jr. et al. | |
| 5,122,568 A * | 6/1992 | dePierne et al. | 524/824 |
| 5,326,843 A * | 7/1994 | Lorah et al. | 526/318.6 |
| 5,349,036 A * | 9/1994 | Simpson et al. | 526/320 |
| 5,385,758 A * | 1/1995 | Ahmed | 427/427.5 |
| 5,470,502 A | 11/1995 | Hahn et al. | |
| 5,650,473 A | 7/1997 | Kimpton et al. | |
| 5,688,435 A | 11/1997 | Chang et al. | |
| 5,710,197 A | 1/1998 | Fischer et al. | |
| 5,723,434 A * | 3/1998 | Falk et al. | 510/475 |
| 5,789,571 A | 8/1998 | Beavers et al. | |
| 5,795,379 A | 8/1998 | Schwenk et al. | |
| 5,866,076 A * | 2/1999 | Fencl et al. | 422/121 |
| 5,871,872 A | 2/1999 | Matijevic et al. | |
| 5,886,076 A | 3/1999 | Kimpton et al. | |
| 6,174,953 B1 * | 1/2001 | Huybrechts | 524/504 |
| 6,228,824 B1 | 5/2001 | Gorlin | |
| 6,258,764 B1 | 7/2001 | Gorlin | |
| 6,337,359 B1 * | 1/2002 | Diehl et al. | 523/201 |
| 6,420,328 B1 | 7/2002 | Gorlin | |
| 6,444,747 B1 * | 9/2002 | Chen et al. | 524/807 |
| 6,448,215 B1 | 9/2002 | Grande et al. | |
| 6,503,877 B2 | 1/2003 | Grande et al. | |
| 6,624,134 B1 | 9/2003 | Briatore et al. | |
| 6,641,754 B2 * | 11/2003 | Buentello et al. | 252/180 |
| 6,727,317 B2 | 4/2004 | Kurja et al. | |
| 6,774,096 B1 | 8/2004 | Paye | |
| 6,872,444 B2 | 3/2005 | McDonald et al. | |
| 6,878,776 B1 * | 4/2005 | Pascault et al. | 525/113 |
| 6,921,743 B2 | 7/2005 | Scheper et al. | |
| 7,063,895 B2 * | 6/2006 | Rodrigues et al. | 428/461 |
| 2003/0072950 A1 * | 4/2003 | Rodrigues et al. | 428/437 |
| 2003/0126689 A1 | 7/2003 | Arredondo et al. | |
| 2004/0156986 A1 | 8/2004 | Yadav | |
| 2005/0075453 A1 | 4/2005 | Mathauer et al. | |
| 2006/0055316 A1 | 3/2006 | Wu et al. | |

FOREIGN PATENT DOCUMENTS

| | | |
|---|---|---|
| CA | 998790 | 10/1976 |
| EP | 1 918 256 A2 | 5/2008 |
| GB | 2065673 A1 | 7/1981 |
| JP | 57044700 A1 | 3/1982 |
| JP | 60228510 A1 | 11/1985 |
| JP | 5132648 A1 | 11/1991 |
| WO | WO 99/40123 A2 | 8/1999 |
| WO | WO 00/50554 A1 | 8/2000 |

OTHER PUBLICATIONS

Clemens et al, Nanocolarants — Pigments with Dyestuff Properties, Polymer Preprints 41(1), pp. 24-25 (2000).

* cited by examiner

*Primary Examiner*—David Wu
*Assistant Examiner*—Michael M Bernshteyn
(74) *Attorney, Agent, or Firm*—James C. Abruzzo

(57) ABSTRACT

A self-stabilizing dispersion composition having a copolymer having at least one polymerizable acid-containing moiety, wherein the at least one acid-containing moiety is at least partially neutralized before or during polymerization, and at least one hydrophobic moiety. A process for producing such compositions is also provided, as well as a process for encapsulating water-insoluble actives in such copolymers.

6 Claims, No Drawings

OPACIFYING POLYMERS

BACKGROUND OF THE INVENTION

1. Technical Field

The present invention is directed towards copolymers produced by solution polymerization. More particularly, the present invention is directed towards self-stabilizing copolymers having opacifying properties and processes for producing such polymers.

2. Background Information

Polymers having both hydrophobic and hydrophilic constituents such as styrene-acrylic acid copolymers are produced by a variety of processes illustrated in the art. In one process commonly referred to as solution polymerization, the copolymers are formed by polymerizing the water-insoluble monomer, e.g., styrene, and the water-soluble monomer, e.g., a carboxylated monomer, in the presence of a water miscible solvent, neutralizing the acid after the polymerization step has completed, and subsequently removing the water-miscible solvent from the solution. The polymerization step can occur in the presence of a catalyst.

In another variation of this solution polymerization process, these hydrophobic/hydrophilic type polymers are first polymerized, followed by simultaneous neutralization and distillation. Other solution polymerization processes in the art teach polymerizing at least one hydrophilic monomer and at least one hydrophobic ethylenically unsaturated monomer in a non-aqueous solvent, forming an aqueous polymer dispersion from this non-aqueous polymer solution, and subsequently adding an aqueous base or acid. While such polymers provide good soil release properties and are useful in cleaning compositions, they tend not to provide opacity to those compositions.

Emulsion polymerization is an example of another process for producing hydrophobic/hydrophilic type polymers. Such processes typically use surfactants to stabilize the emulsion. For example, processes for producing alkali-soluble emulsion copolymers of methacrylic acid and water-insoluble monomers such as styrene are known that utilize anionic and/or nonionic surfactants in an amount sufficient to stabilize the emulsion. Emulsion copolymers can be used as opacifiers in detergent, personal care and other applications. However, they tend not to provide good cleaning benefits in end use application. Consequently, other cleansing polymers are required in detergent formulations that make use of such emulsion copolymers.

Accordingly, there is a need for polymeric ingredients or compounds that are useful in cleaning compositions while also providing opacity to those compositions. Further, there is a need for dispersion polymers that are self-stabilizing.

SUMMARY OF THE INVENTION

The present invention provides a dispersion polymer that is self-stabilizing. For the purpose of the present invention, a self-stabilizing dispersion is defined as one that does not need any surfactants to stabilize the dispersion, as surfactants can interfere with the ability to formulate these materials. Further, for the purpose of the present application, emulsion polymers are defined as systems where surfactants are used to stabilize the dispersion. Like emulsion polymers, these self-stabilizing dispersion materials can be used as opacifiers in detergent, personal care and other applications. However, unlike emulsion polymers, the dispersion polymers of this invention provide good cleaning benefits in end use applications.

Current opacifier technologies utilize high molecular weight emulsion polymers (i.e., a number average molecular weight ('Mn') greater than about 100,000 Daltons ('Da')) of core-shell type morphology. In contrast, the polymers according to the present invention are low molecular weight solution polymers (i.e., Mn less than about 50,000 Da). They have the additional advantage of providing functionality to detergent formulations, such as dispersancy and anti-redeposition.

Further, the process of the present invention produces extremely hydrophobic polymers that previously could only be produced by emulsion polymerization. For the purpose of the present application, "extremely hydrophobic polymers" refers to those polymers having a water solubility of less than 1 g/l. Such polymers can be produced from hydrophobic monomers such as styrene. The process according to the present invention allows formulation and use of these very hydrophobic copolymers in aqueous systems or formulations. In one aspect, these copolymers can be used as opacifiers in aqueous formulations. Examples of such hydrophobically modified copolymers include solution polymers of acrylic acid and styrene.

In one aspect according to the process of the present invention, the dispersion copolymer is produced as neutralized materials. This makes it easier to formulate the dispersion copolymer into formulations that are neutral or alkaline pH, as opposed to traditional emulsion copolymers that are typically acidic. Such emulsion polymers have to be diluted before formulation, adding another step in the formulation process.

According to the present invention, the above dispersion copolymers are synthesized by a process wherein the acid monomer is neutralized during polymerization. The resulting polymer provides for a self-stabilizing emulsion that maintains its particulate nature even on dilution. These particles can lend opacity to aqueous formulations such as liquid detergents.

One process according to the present invention for manufacturing the dispersion is as follows. At least one hydrophobic and at least one water-soluble acid-containing monomer are polymerized in the presence of water, one or more water miscible solvents and one or more neutralizing agents. Once polymerized, the water-miscible solvent(s) is removed from the solution.

The present invention also discloses a process for encapsulating or creating microparticulates containing hydrophobic or water-insoluble actives such as perfumes and flavors. This process involves polymerizing at least one hydrophobic monomer and at least one water-soluble acid-containing monomer in the presence of water, one or more water-miscible solvents and one or more neutralizing agents and the water insoluble active. The active can be dissolved in a mixture of water, one or more water miscible solvents and one or more neutralizing agents. The monomers are then added to the system, with polymerization occurring in the presence of the water-insoluble active. Alternatively, the monomers can be polymerized and the water-insoluble active(s) added at the end of the polymerization process. Particles or particulates are formed during the latter stages of the polymerization process or when the water miscible solvent is distilled or stripped off. The active ingredient is then incorporated into these particles.

In one embodiment, the dispersion copolymer is prepared from at least one hydrophilic acid-containing monomer. This acid-containing monomer includes, for example, polymerizable carboxylic and/or sulfonic acid-containing monomers. Such monomers can be partially or completely neutralized at the beginning of or during the polymerization process.

The dispersion copolymer is further prepared from at least one hydrophobic moiety. This hydrophobic moiety can be prepared from at least one hydrophobic monomer and/or chain transfer agent. Useful hydrophobic monomers include saturated or unsaturated alkyl, hydroxy alkyl, alkoxyalkyl group, alkoxyaryl, aryl and aryl-alkyl group, alkyl sulfonate, aryl sulfonate, siloxane and combinations thereof. Useful chain transfer agents can have 1 to 24 carbon atoms and include mercaptans, amines, alcohols, α-olefin sulfonates and combinations thereof.

Accordingly, the present invention provides for a self-stabilizing dispersion copolymer having at least one polymerizable acid-containing moiety, wherein the at least one acid-containing moiety is at least partially neutralized before or during polymerization, and at least one hydrophobic moiety. Examples of useful polymerizable acid-containing moieties include acrylic acid, methacrylic acid, ethacrylic acid, α-chloro-acrylic acid, α-cyano acrylic acid, β-methyl-acrylic acid (crotonic acid), α-phenyl acrylic acid, β-acryloxy propionic acid, sorbic acid, α-chloro sorbic acid, angelic acid, cinnamic acid, p-chloro cinnamic acid, β-styryl acrylic acid (1-carboxy-4-phenyl butadiene-1,3), itaconic acid, citraconic acid, mesaconic acid, glutaconic acid, aconitic acid, fumaric acid, tricarboxy ethylene, 2-acryloxypropionic acid, 2-acrylamido-2-methyl propane sulfonic acid, vinyl sulfonic acid, vinyl phosphonic acid, sodium methallyl sulfonate, sulfonated styrene, allyloxybenzene sulfonic acid, maleic acid, maleic anhydride or combinations thereof. In one aspect, the acid containing moiety is acrylic acid, methacrylic acid, maleic acid, itaconic acid or mixtures thereof.

The hydrophobic moiety can be prepared from at least one hydrophobic monomer, at least one chain transfer agent or combinations thereof. Examples of useful hydrophobic monomers include styrene, α-methyl styrene, 2-ethylhexyl acrylate, octyl acrylate, lauryl acrylate, stearyl acrylate, behenyl acrylate, 2-ethylhexyl methacrylate, octyl methacrylate, lauryl methacrylate, stearyl methacrylate, behenyl methacrylate, 2-ethylhexyl acrylamide, octyl acrylamide, lauryl acrylamide, stearyl acrylamide, behenyl acrylamide, propyl acrylate, butyl acrylate, pentyl acrylate, hexyl acrylate, 1-vinyl naphthalene, 2-vinyl naphthalene, 3-methyl styrene, 4-propyl styrene, t-butyl styrene, 4-cyclohexyl styrene, 4-dodecyl styrene, 2-ethyl-4-benzyl styrene, 4-(phenylbutyl) styrene or combinations thereof. The hydrophobic monomer can also be siloxane, saturated or unsaturated alkyl, and alkoxy group, aryl and aryl-alkyl group, alkyl sulfonate, aryl sulfonate or combinations thereof.

When the hydrophobic moiety is prepared from one or more chain transfer agents, the chain transfer agent(s) can include 1 to 24 carbon atoms. Further, useful chain transfer agents include mercaptan, amine, alcohol, α-olefin sulfonate or combinations thereof.

The present invention is also directed towards personal care formulations and detergents formulated with the self-stabilizing dispersion copolymer.

The present invention is also directed towards a manufacturing process for producing the self stabilizing dispersion copolymer. This manufacturing process involves at least polymerizing a hydrophobic moiety and a water-soluble acid-containing monomer in the presence of one or more water-miscible solvents and one or more neutralizing agents, and removing the one or more water-miscible solvents from the solution. Useful neutralizing agents include NaOH, KOH, $Ca(OH)_2$, $Mg(OH)_2$, $Zn(OH)_2$, ammonia, diethanol amine, monoethanol amine, triethanolamine, morpholine, the lower alkyl amines, lower alkanol amines, 2-dimethylaminoethanol, N-methyl morpholine, ethylene diamine or combinations thereof.

The present invention is also directed towards a process for encapsulating a water insoluble active. This encapsulation process involves at least polymerizing one or more hydrophobic monomers and one or more water-soluble acid-containing monomers in the presence of one or more water-miscible solvents and one or more neutralizing agents, thereby producing a self-stabilizing solution, adding the water insoluble active, and removing the one or more water-miscible solvents from the solution. The water insoluble active can be added before or during the polymerization step. Useful water insoluble actives include. One skilled in the art will readily recognize suitable actives depending upon end-use application.

DETAILED DESCRIPTION OF THE INVENTION

In one embodiment, the self-stabilizing dispersion copolymer includes a polymer having at least one acid-containing hydrophilic moiety, wherein the acid-containing moiety is at least partially or even completely neutralized before or during polymerization, and at least one hydrophobic moiety prepared from at least one hydrophobic monomer and/or chain transfer agent. Useful hydrophobic monomers include siloxanes, saturated or unsaturated alkyls, alkoxy groups, aryl and aryl-alkyl groups, alkyl sulfonates, aryl sulfonates and combinations thereof. Useful chain transfer agents can have 1 to 24 carbon atoms and include mercaptans, amines, alcohols, α-olefin sulfonates and combinations thereof.

Examples of useful polymerizable acid-containing hydrophilic monomers include acrylic acid, methacrylic acid, ethacrylic acid, α-chloro-acrylic acid, α-cyano acrylic acid, β-methyl-acrylic acid (crotonic acid), α-phenyl acrylic acid, β-acryloxy propionic acid, sorbic acid, α-chloro sorbic acid, angelic acid, cinnamic acid, p-chloro cinnamic acid, β-styryl acrylic acid (1-carboxy-4-phenyl butadiene-1,3), itaconic acid, citraconic acid, mesaconic acid, glutaconic acid, aconitic acid, fumaric acid, tricarboxy ethylene, 2-acryloxypropionic acid, 2-acrylamido-2-methyl propane sulfonic acid, vinyl sulfonic acid, vinyl phosphonic acid, sodium methallyl sulfonate, sulfonated styrene, allyloxybenzene sulfonic acid, maleic acid, and maleic anhydride. Combinations of acid-containing hydrophilic monomers can also be used. In one aspect the acid-containing hydrophilic constituent is selected from acrylic acid, methacrylic acid, maleic acid, itaconic acid and mixtures thereof.

According to the process of the present invention, the acid-containing monomers are neutralized during polymerization. Neutralization agents include, for example, NaOH, KOH, $Ca(OH)_2$, $Mg(OH)_2$, $Zn(OH)_2$, ammonia and amines such as diethanol amine, monoethanol amine, triethanolamine, morpholine, the lower alkyl amines, lower alkanol amines, 2-dimethylaminoethanol, N-methyl morpholine, and ethylene diamine. Combinations of neutralization agents can also be used. The choice and level of neutralization agent depends on the relative difference in solubility of the acid monomer and the hydrophobic monomer in the water/water miscible solvent mixture.

Further, the acid moieties can be partially or fully neutralized according to the process of the present invention. The type and degree of neutralization can affect the solubility difference between the monomers, thus driving the system to form a dispersed particle rather than a true solution. For example, polymerization of acrylic acid and styrene in water and the water miscible solvent isopropanol without neutralization during polymerization will produce a water soluble polymer (as exemplified by comparative Example 5 found herein). However, when the acid moiety is neutralized during polymerization, the dispersion copolymer of the present invention is produced. This is due to the larger difference in solubility of the potassium salt of acrylic acid with styrene as compared to the acrylic acid with styrene. Without being bound by theory, it is believed that an increase in the difference in solubility produces blocks of acid functional and hydrophobic monomers in the polymer rather than random copolymers. While the polymer formed is not truly di-block or tri-block, it is blockier than the random copolymer of traditional solution processes. It is believed that this forces the polymer into a dispersed particle.

The solubility difference can also be manipulated by changing the ratio of water to water miscible solvent in the system. Increasing the water level increases the solubility of the neutralized acid monomer and decreases the solubility of the hydrophobic monomer. Likewise, decreasing the water level decreases the solubility of the neutralized acid monomer and increases the solubility of the hydrophobic monomer. Manipulation of this solubility difference is key to producing a stable dispersion.

Examples of useful hydrophobic monomers include styrene, α-methyl styrene, 2-ethylhexyl acrylate, octyl acrylate, lauryl acrylate, stearyl acrylate, behenyl acrylate, 2-ethylhexyl methacrylate, octyl methacrylate, lauryl methacrylate, stearyl methacrylate, behenyl methacrylate, 2-ethylhexyl acrylamide, octyl acrylamide, lauryl acrylamide, stearyl acrylamide, behenyl acrylamide, propyl acrylate, butyl acrylate, pentyl acrylate, hexyl acrylate, 1-vinyl naphthalene, 2-vinyl naphthalene, 3-methyl styrene, 4-propyl styrene, t-butyl styrene, 4-cyclohexyl styrene, 4-dodecyl styrene, 2-ethyl-4-benzyl styrene, and 4-(phenylbutyl) styrene. Combinations of hydrophobic monomers can also be used.

The hydrophobic moieties are selected from siloxanes, aryl sulfonate, saturated and unsaturated alkyl moieties optionally having functional end groups, wherein the alkyl moieties can have from 5 to 24 carbon atoms. In another aspect, the alkyl moieties can have from 6 to 18 carbon atoms. In even another aspect, the alkyl moieties can have from 8 to 16 carbon atoms. These alkyl moieties can be optionally bonded to the hydrophilic backbone by means of an alkoxylene or polyalkoxylene linkage such as a polyethoxy, polypropoxy or butyloxy (or mixtures thereof) linkage having from 1 to 50 alkoxylene groups. Alternatively, the hydrophobic moiety can be composed of relatively hydrophobic alkoxy groups such as butylene oxide and/or propylene oxide in the absence of alkyl or alkenyl groups.

Alternatively, or in addition to, the hydrophobic moiety can be introduced into the dispersion copolymer in the form of a chain transfer agent. In one embodiment the chain transfer agent has from 1 to 24 carbon atoms. In another embodiment the chain transfer agent has from 1 to 14 carbon atoms. In even another embodiment the chain transfer agent has from 3 to 12 carbon atoms. The chain transfer agent can be selected from mercaptans or thiols, amines, alcohols, or α-olefin sulfonates. A combination of chain transfer agents can also be used.

Mercaptans useful in this invention include organic mercaptans having at least one —SH or thiol group and which are classified as aliphatic, cycloaliphatic, or aromatic mercaptans. The mercaptans can contain other substituents in addition to hydrocarbon groups. Such substituents include carboxylic acid groups, hydroxyl groups, ether groups, ester groups, sulfide groups, amine groups and amide groups. Suitable mercaptans include, for example, methyl mercaptan, ethyl mercaptan, butyl mercaptan, mercaptoethanol, mercaptopropanol, mercaptobutanol, mercaptoacetic acid, mercaptopropionic acid, thiomalic acid, benzyl mercaptan, phenyl mercaptan, cyclohexyl mercaptan, 1-thioglycerol, 2,2'-dimercaptodiethyl ether, 2,2'-dimercaptodipropyl ether, 2,2'-dimercaptodiisopropyl ether, 3,3'-dimercaptodipropyl ether, 2,2'-dimercaptodiethyl sulfide, 3,3'-dimercaptodipropyl sulfide, bis(β-mercaptoethoxy) methane, bis(β-mercaptoethylthio)methane ethanedithio-1,2, propanedithiol-1,2, butanedithiol-1,4, 3,4-dimercaptobutanol-1, trimethylolethane tri (3-mercaptopropionate), pentaerythritol tetra(3-mercaptopropionate), trimethylolpropane trithioglycolate, pentaerythritol tetrathio-glycolate, octanethiol, decanethiol, dodecanethiol, and octadecylthiol. In one aspect the mercaptan chain transfer agent includes 3-mercaptopropionic acid and dodecanethiol.

Suitable amines useful as chain transfer agents include, for example, methylamine, ethylamine, isopropylamine, n-butylamine, n-propylamine, iso-butylamine, t-butylamine, pentylamine, hexylamine, benzylamine, octylamine, decylamine, dodecylamine, and octadecylamine. In one aspect the amine chain transfer agent includes isopropyl amine and docylamine.

Suitable alcohols useful as chain transfer agents include, for example, methanol, ethanol, isopropanol, n-butanol, n-propanol, iso-butanol, t-butanol, pentanol, hexanol, benzyl alcohol, octanol, decanol, dodecanol, and octadecanol. In one aspect the alcohol chain transfer agent includes isopropanol and dodecanol.

Other hydrophobic monomers that can be used to produce the dispersion copolymer include α-olefin sulfonates such as the $C_8$-$C_{18}$ α-olefin sulfonates commercially available as Bioterge AS40 (Stepan Company, Northfield, Ill.), Hostapur OS liquid (Clariant International Ltd., Muttenz, Switzerland), and Witconate AOS (Crompton Corporation, Middlebury, Conn.).

In one aspect the water-miscible solvent is capable of forming an azeotrope with water. Examples of solvents useful in the present invention include alcohols such as methanol, ethanol, and isopropyl alcohol; glycol ethers; and acetone. If the solvent is a low boiling solvent such as an alcohol or acetone, it can be stripped from the solution.

The present invention also discloses a process for encapsulating or creating microparticulates containing hydrophobic or water-insoluble actives such as perfumes and flavors. This process involves polymerizing at least one hydrophobic monomer and at least one water-soluble acid-containing monomer in the presence of water, one or more water-miscible solvents and one or more neutralizing agents and the water insoluble active. The active can be dissolved in a mixture of water, one or more water miscible solvents and one or more neutralizing agents. The monomers are then added to the system, with polymerization occurring in the presence of the water-insoluble active. Alternatively, the monomers can be polymerized and the water-insoluble active(s) added at the end of the polymerization process. Particles or particulates are formed during the latter stages of the polymerization process or when the water miscible solvent is distilled or stripped off. The active ingredient is then incorporated into these particles.

As an example, one application of the present process involves encapsulation of laundry detergent and automatic dishwasher active ingredients. These encapsulated active ingredients can include rinse aids, fragrances, anti-wrinkling aids, one or more surfactants, builders, ion exchangers, alkalis, anticorrosion materials, anti-redeposition materials, optical brighteners, fragrances, dyes, chelating agents, enzymes, whiteners, brighteners, antistatic agents, sudsing control agents, solvents, hydrotropes, bleaching agents, perfumes, bleach precursors, water, buffering agents, soil removal agents, soil release agents, softening agents, silicones, enzymes, inert diluents, buffering agents, corrosion inhibitors, graying inhibitors, stabilizers or combinations thereof.

The process for encapsulation according to the present invention is also useful in many other applications requiring a protective coating. For example, the process can be used as a coating for pills. Such coatings can be formulated so that they do not dissolve in the mouth, but instead dissolve elsewhere in the gastro-intestinal tract, thereby enabling a controlled release of the active material. Likewise, cleaning actives could be encapsulated and released in a controlled manner in a toilet bowl. Nutrients and/or weed killers can be encapsulated for controlled release in agricultural applications. The process can encapsulate organic liquids such as fragrances for release under a given set of conditions. These encapsulated fragrances can be used in a variety of applications, e.g., kitty litter, diapers and feminine care products, etc. One of skill in the art will recognize many other applications for which these polymers are useful as protective coatings.

The encapsulation process according to the present invention is useful for encapsulating materials in a liquid detergent where solid materials are suspended in the liquid detergent. The coating can be insoluble due to ionic strength, high surfactant concentration, and/or high pH of the liquid detergent. The coating can be designed to disintegrate, for example, either as the liquid detergent is diluted in the wash water or later in the rinse cycle. Shampoo, body wash and other personal care products can also be formulated containing actives encapsulated using this process.

Microcapsules containing active ingredients can be formulated into liquid detergents for laundry or dishwash applications, as well as shampoo and bodywash applications. In one aspect, the encapsulated active ingredient(s) would be protected from reacting with other ingredients in the detergent, shampoo, or bodywash in formulation, and released when diluted in-use. For example, this can be useful in a shampoo/conditioner having a conditioner encapsulated by the process of the present invention where the conditioner is not be released until the shampoo is diluted, thus allowing the conditioner to work on the hair after shampooing.

The microcapsules of encapsulated actives or actives adsorbed onto inert solids can be made large enough to be visible, adding an attractive visual effect of suspended capsules in a personal case formulation. One skilled in the art will recognize that the encapsulated materials of this invention can be used in other applications such as water treatment, oil field, paper coating, and pharmaceuticals.

POLYMER EXAMPLES

Example 1

An initial charge of 534 g of deionized water and 486 g of isopropyl alcohol as cosolvent, 326 g of 45% KOH solution as neutralizer, and 0.147 grams of ferrous ammonium sulfate hexahydrate were added to a 2-liter glass reactor. The reactor contents were heated to reflux (approximately 84° C.).

At reflux, a monomer solution of 188 g of acrylic acid and 272 g of styrene were continuously added to the reactor over a 3.5 hour period. The following initiator solution was added at the same time as the monomer solution, but over a 4 hour period instead.

| Initiator solution | |
|---|---|
| Sodium persulfate | 20 g |
| Water | 83 g |
| Hydrogen peroxide 35% | 58.2 g |

After adding the monomer and initiator solutions, the reaction temperature was then maintained at about 84° C. for one hour. 7.4 grams of erythrobic acid dissolved in 29 grams of water was added over this 1 hour period. 7.4 grams of t-butyl hydroperoxide (70% solution in water) dissolved in 29 grams of water was also added over the same 1 hour period. Both the erythrobic acid and the t-butyl hydroperoxide serve in consuming any residual monomer that may be left unreacted. The reaction was then held at 84° C. for an additional hour. The alcohol cosolvent was removed from the polymer solution by azeotropic distillation under vacuum. During distillation, 230 grams of deionized water was added to the polymer solution. A small amount of ANTIFOAM 1400 (0.10 g) (100% active silicone fluid, Dow Corning, Midland, Mich.) was added to suppress any foam generated during distillation. Approximately 780 g of water and isopropyl alcohol were distilled off. The final solution was an opaque white milky dispersion.

Example 1A

Stability Testing

TABLE 1

Stability Comparison

| Polymer | Aging test | Result |
|---|---|---|
| Example 1 | 1 year at room temperature | Stable, no phase separation |
| Example 1 | 1 freeze thaw cycle | Stable, no phase separation |
| Commercial styrene-acrylic emulsion copolymer (Acusol ™ OP 301, available from Rohm and Haas, Philadelphia, PA) | 1 freeze thaw cycle | Unstable, phase separation |

Example 2

An initial charge of 174 g of deionized water, 159 g of isopropyl alcohol, 63.6 g of 45% KOH solution and 0.0478 grams of ferrous ammonium sulfate hexahydrate were added to a 3 liter glass reactor. The reactor contents were heated to reflux (approximately 84° C.).

At reflux, a monomer solution of 36.7 g of acrylic acid and 124 g of styrene was continuously added to the reactor over a 3.5 hour period. The following initiator solution was added at the same time as the monomer solution, but over a 4 hour period.

| Initiator solution | |
|---|---|
| Sodium persulfate | 6.5 g |
| Water | 27 g |
| Hydrogen peroxide 35% | 19.0 g |

After adding the monomer and initiator solutions, the reaction temperature was then maintained at about 84° C. for one hour. 1.2 grams of erythrobic acid dissolved in 10 grams of water was added over this 1-hour period. 1.2 grams of t-butyl hydroperoxide (70% solution in water) dissolved in 10 grams of water was also added over this same 1-hour period. The reaction was then held at 84° C. for an additional hour. The alcohol cosolvent was removed from the polymer solution by azeotropic distillation under vacuum. During distillation, 60 grams of deionized water was added to the polymer solution. A small amount of ANTIFOAM 1400 (0.10 g) was added to suppress any foam generated during distillation. Approximately 240 g of water and isopropyl alcohol were distilled off. The final solution was an opaque white milky dispersion.

Example 3

An initial charge of 534 g of deionized water, 486 g of isopropyl alcohol, 272 g of 45% KOH solution and 0.147 grams of ferrous ammonium sulfate hexahydrate were added to a 3 liter glass reactor. The reactor contents were heated to reflux (approximately 84° C.).

At reflux, a monomer solution of 188 g of methacrylic acid and 151 g of styrene were continuously added over a period of 3.5 hours. The following initiator solution was added at the same time as the monomer solution, but over a period of 4 hours.

| Initiator solution | |
|---|---|
| Sodium persulfate | 20 g |
| Water | 83 g |
| Hydrogen peroxide 35% | 58.2 g |

After adding the monomer and initiator solutions, the reaction temperature was maintained at about 84° C. for one hour. 7.4 grams of erythrobic acid dissolved in 29 grams of water was added over this 1-hour period. 7.4 grams of t-butyl hydroperoxide (70% solution in water) dissolved in 29 grams of water was also added over the same 1-hour period. The reaction was then held at 84° C. for an additional hour. The alcohol cosolvent was removed from the polymer solution by azeotropic distillation under vacuum. During distillation, 230 grams of deionized water was added to the polymer solution. A small amount of ANTIFOAM 1400 (0.10 g) was added to suppress any foam generated during distillation. Approximately 780 g of water and isopropyl alcohol were distilled off. The final solution was an opaque white milky dispersion.

Example 4

An initial charge of 150 g of deionized water, 264 g of isopropyl alcohol and 0.0799 grams of ferrous ammonium sulfate hexahydrate were added to a 2 liter glass reactor. The reactor contents were heated to reflux (approximately 84° C.).

At reflux, a monomer solution of 102 g of acrylic acid and 147.6 g of styrene was added over a 3 hour period. The following initiator, caustic and chain transfer solutions were added at the same time as the monomer solution, but over a period of 3.5, 3 and 2.5 hours, respectively.

| Initiator solution | |
|---|---|
| Sodium persulfate | 20 g |
| Water | 83 g |
| Hydrogen peroxide 35% | 58.2 g |
| Caustic solution | |
| 50% NaOH | 119 g |
| Deionized water | 119 g |
| Chain transfer solution | |
| 3-mercapto propionic acid | 9.3 g |
| Deionized water | 44 g |

After adding the monomer, initiator, chain transfer and caustic solutions, the reaction temperature was maintained at about 84° C. for one hour. 2 grams of erythrobic acid dissolved in 15 grams of water was added over a 30-minute period. 2 grams of t-butyl hydroperoxide (70% solution in water) dissolved in 15 grams of water was added over the same 30-minute period. The reaction was then held at 84° C. for an additional hour. The alcohol cosolvent was removed from the polymer solution by azeotropic distillation under vacuum. During distillation, 450 grams of deionized water was added to the polymer solution. A small amount of ANTIFOAM 1400 (0.10 g) was added to suppress any foam generated during distillation. Approximately 290 g of water and isopropyl alcohol were distilled off. The final solution was an opaque white milky dispersion.

Example 5

Comparative example of a solution polymer synthesized by addition of a neutralization agent during distillation as described in U.S. Pat. No. 5,650,473

An initial charge of 150 g of deionized water, 264 g of isopropyl alcohol (cosolvent) and 0.0799 grams of ferrous ammonium sulfate hexahydrate were added to a 2 liter glass reactor. The reactor contents were then heated to reflux (approximately 84° C.).

At reflux, a monomer solution of 102 g of acrylic acid and 147.6 g of styrene was continuously added over a 3 hour period. The following initiator and chain transfer solutions were added at the same time as the monomer solution, but over a period of 3.5 and 2.5 hours, respectively.

| Initiator solution | |
|---|---|
| Sodium persulfate | 20 g |
| Water | 83 g |
| Hydrogen peroxide 35% | 58.2 g |
| Chain transfer solution | |
| 3-mercapto propionic acid | 9.3 g |
| DI water | 44 g |

After addition of the monomer, initiator and chain transfer solutions, the reaction temperature was maintained at about 84° C. for one hour. 2 grams of erythrobic acid dissolved in 15 grams of water was added over 30 minutes. Over the same 30-minute time period, 2 grams of t-butyl hydroperoxide (70% solution in water) dissolved in 15 grams of water were added. The reaction was then held at 84° C. for an additional hour. The alcohol cosolvent was removed from the polymer solution by azeotropic distillation under vacuum. A solution of 119 grams of 50% NaOH dissolved in 119 grams of deionized water was added during the distillation. A small amount of ANTIFOAM 1400 (0.10 g) was added to suppress any foam generated during distillation. Approximately 290 g of water and isopropyl alcohol were distilled off. The final solution was a clear yellow to amber solution.

Comparative Examples

Example 6

The opacifying properties of the polymer of Example 1 was compared to that of a comparative polymer produced by the process described in U.S. Pat. No. 5,650,473 for making styrene copolymers and as detailed in Example 5. The results are provided below in Table 2.

TABLE 2

Opacity Results

| Polymer | Wt % active polymer in commercial bleach | Opacity of the commercial bleach solution with polymer | Particle size of the polymer solution as measured by light scattering (nm) |
|---|---|---|---|
| Example 1 | 0.05 | Opaque white solution | 300 to 500 |
| Comparative polymer of Example 5 | 0.05 | No opacity | No particles detected |
| Commercial styrene-acrylic emulsion copolymer (Acusol ™ OP 301 available from Rohm and Haas, Philadelphia, PA) | 0.05 | Opaque white solution | 600 to 800 |

The above data indicates that polymers according to this invention (here, the polymer of Example 1), when synthesized by a process that includes pre-neutralization, are excellent opacifiers and compare well with the performance of a commercial opacifier. However, the comparative polymer made by post-neutralization does not have opacifying properties because it is a true solution. This is explained by the particle size data. The polymer of Example 1 is in the formed of dispersed particles whereas the comparative polymer of Example 5 is in the form a true solution.

Further, the commercial opacifier is a 40% solution that has to be diluted to a 10% solution before it can be added to a formulation. The opacifiers of this invention do not have to prediluted and can be used as a 40% solution, making it easier to formulate.

Example 7

Soil Anti-Redeposition

The polymer of Example 1 was tested for anti-redeposition properties in a commercial liquid detergent (Wisk) formulation. The test was conducted in a full scale washing machine using 3 cotton and 3 polyester/cotton swatches. The soil used was 17.5 g rose clay, 17.5 g bandy black clay (a standard clay used in detergency testing) and 6.9 g oil blend (75:25 vegetable/mineral). The test was conducted over 3 cycles using 118 g of commercial liquid laundry detergent per wash load. The polymer of Example 1 was dosed as detailed in the Table. Wash conditions were temperature of 34° C. (93° F.), 150 ppm hardness and a 10-minute wash cycle.

TABLE 3

Change in Color (ΔE)

| Sample | ΔE Cotton | ΔE Polyester/cotton |
|---|---|---|
| Commercial detergent | 1.63 | 0.72 |
| 0.1% Example 1 | 0.42 | 0.22 |
| 0.1% commercial opacifier (Acusol ™ OP 301 available from Rohm and Haas, Philadelphia, PA) | 1.7 | 0.8 |

The color indices L (white to black) a (red to green) and b (blue to yellow) of the test swatches were measured before and after the 3 wash cycles. L, a and b values before the first wash cycle and after the third cycle were measured as $L_1$, $a_1$, $b_1$ and $L_2$, $a_2$, $b_2$, respectively, using a spectrophotometer. The change in 'color' ('ΔE') was then calculated using the following equation—

$$\Delta E=[(L_1-L_2)^2+(a_1-a_2)^2+(b_1-b_2)^2]^{0.5}$$

ΔE is a measure of how clean the test swatches are after the 3 wash cycles. The lower the ΔE value, the less of a change from the original swatch color. Accordingly, a smaller ΔE means better cleaning. The data indicates that small amounts of polymer according to the present invention provide commercial detergent formulations with excellent anti-redeposition properties (the smaller the ΔE, the better the anti-redeposition property). In contrast, the commercial opacifier produced by emulsion polymerization does not provide any anti-redeposition properties.

Example 8

Opacity Evaluation

Dilutions of Polymer 1 were prepared with deionized water for evaluation on a Hach Turbidimeter. A commercial liquid laundry detergent sample (Wisk) was run to determine the level of turbidity that their current product provides. (It should be noted that the commercial product also contains blue dye.)

TABLE 4

Opacity Evaluation

| Example 1 Polymer Weight % | NTUs |
|---|---|
| 0.01 | 191 |
| 0.02 | 354 |
| 0.04 | 628 |
| 0.06 | 868 |
| 0.08 | 1087 |
| 0.10 | 1298 |
| Commercial Detergent sample with opacifier | 260 |

The data indicate that a small amount of opacifier according to the present invention (0.01 to 0.02 weight percent of formulation) provides similar opacity to that of commercial formulations.

Example 9

Calcium Binding Capacity

The calcium binding capacity of polymer was determined through the EDTA titration procedure. The data indicate that the calcium binding of polymers of this invention are similar to that of the conventional solution polymers. However, as seen in Example 6, the conventional solution polymer does not provide opacifying properties. Furthermore, the calcium binding is far superior to commercial opacifier materials.

TABLE 5

Calcium Binding Capacity

| Sample | CBC |
| --- | --- |
| Example 1 | 148.9 |
| Comparative polymer of Example 5 | 142.4 |
| Commercial opacifier of Example 6 | 0 |

Example 10

Encapsulation of a Water Insoluble Additive or Active

An initial charge of 174 g of deionized water and 158 g of isopropyl alcohol as the solvent, 105 g of 45% KOH solution as the neutralizer, 23.6 grams of orange oil (water insoluble active) and 0.04794 grams of ferrous ammonium sulfate hexahydrate were added to a 2 liter glass reactor. The reactor contents were heated to reflux (approximately 84° C.).

Once at reflux, continuous additions of 61 g of acrylic acid monomer and 89 g of styrene monomer were added over a 3-hour period. The following initiator solution was added at the same time as this monomer solution but over a total time of 3.5 hours.

| Initiator solution | |
| --- | --- |
| Sodium persulfate | 6.5 g |
| Water | 27 g |
| Hydrogen peroxide 35% | 19 g |

After adding all of the monomer and initiator solutions, the reaction temperature was maintained at about 84° C. for one hour. 2.4 grams of erythrobic acid dissolved in 29 grams of water was added over 1 hour. At the same time, 2.4 grams of t-butyl hydroperoxide (70% solution in water) dissolved in 29 grams of water was added over this 1-hour period. The reaction was then held at 84° C. for an additional hour. The alcohol cosolvent was removed from the polymer solution by azeotropic distillation under vacuum. During the distillation, 60 grams of deionized water was added to the polymer solution. A small amount of ANTIFOAM 1400 (0.10 g) was added to suppress any foam generated during distillation. Approximately 240 g of water and isopropyl alcohol were distilled off. The final solution was an opaque white milky dispersion.

Example 11

An initial charge of 180 g of deionized water and 180 g of isopropyl alcohol were added to a 2 liter glass reactor. The reactor contents were heated to reflux (approximately 83° C.).

At reflux, 96 g of acrylic acid and 85 g of lauryl methacrylate were added continuously over a period of 1.5 hours. 107 g of NaOH was also added at the same time the monomers were over that 1.5 hour period. The following initiator solution was added at the same time as the monomer solution, but over a period of 2 hours instead of 1.5 hours.

| Initiator solution | |
| --- | --- |
| Sodium persulfate | 16 g |
| Water | 80 g |

After adding all of the monomers (acrylic acid and lauryl methacrylate), caustic (NaOH) and initiator solution, the reaction temperature was maintained at about 83° C. for one hour. The alcohol cosolvent was removed from the polymer solution by azeotropic distillation under atmospheric pressure. During distillation 80 grams of deionized water was added to the polymer solution. A small amount of ANTIFOAM 1400 (0.10 g) was also added to suppress any foam generated during distillation. Approximately 252 g of a mixture of water and isopropyl alcohol were distilled off. The final solution was an opaque white milky dispersion.

Example 12

Dilutions of Polymer 11 were prepared with DI water for evaluation on a Hach Turbidimeter. A commercial liquid laundry detergent sample (Wisk) was run to determine the level of turbidity that this commercial product provides. (It should be noted that the commercial product contains blue dye.)

TABLE 6

Opacity Evaluation

| Wt % Polymer of Example 11 | NTUs |
| --- | --- |
| 0.050 | 95.5 |
| 0.075 | 147 |
| 0.100 | 213 |
| 0.125 | 294 |
| 0.150 | 384 |
| 0.175 | 509 |
| 0.200 | 637 |
| Commercial Detergent sample with opacifier | 260 |

The data indicates that small amounts of opacifier according to the present invention (here, 0.100 to 0.125 weight % of formulation) will provide similar opacity to that of commercial formulations.

Product Formulation Examples

Example 13

Personal Care Formulations

| Ingredients | Weight % |
| --- | --- |
| Shampoo formulation | |
| Lauryl ether sulfate 2 EO | 16.0 |
| Cocamidopropyl betaine | 2.0 |
| Deposition polymer | 0.1 |
| Dimethiconol polymer emulsion (60%) | 3.2 |
| Polymer of Example 1 | 0.1 |
| Water | Balance |
| Water repellant sunscreen | |
| Glycerin | 5.0 |
| Polymer of Example 4 | 2.0 |
| PEG 100 stearate | 5.0 |
| Isostearyl stearate | 4.0 |
| Octyl methoxycinnamate | 7.5 |
| Butyl methoxydibenzoylmethane | 1.5 |
| Hexyl methicone | 5.0 |
| DI water | balance |

Example 14

Liquid Detergent Formulation

| Ingredient | Weight % |
| --- | --- |
| DI Water | 34.25 |
| Sodium Citrate | 9.0 |
| Propylene Glycol | 8.0 |
| Sodium xylene sulfonate (40%) | 18.75 |
| Bio-Soft D-40 (sodium alkylbenzene sulfonate, linear, Stepan Company, Northfield, Illinois) | 20.00 |
| Neodol 25-9 ($C_{12}$-$C_{15}$ alcohol ethoxylate, 9 moles EO per mole alcohol, Shell Chemicals, Houston, Texas) | 7.0 |
| Polymer of Example 1 | 0.10 |
| Water, fragrance, colorants | balance |

Example 15

Hard Surface Cleaning Formulations

| Ingredient | Weight % |
| --- | --- |
| Acid Cleaner | |
| Citric acid (50% solution) | 12.0 |
| C12-15 linear alcohol ethoxylate with 3 moles of EO | 5.0 |
| Alkylbenzene sulfonic acid | 3.0 |
| Polymer of Example 2 | 0.2 |
| Water | |
| Alkaline Cleaner | |
| Water | 89.0 |
| Sodium tripolyphosphate | 2.0 |
| Sodium silicate | 1.9 |
| NaOH (50%) | 0.1 |
| Dipropylene glycol monomethyl ether | 5.0 |
| Octyl polyethoxyethanol, 12-13 moles EO | 1.0 |
| Polymer of example 3 | 0.1 |

Example 16

Automatic Dishwash Formulation

| Ingredients | Weight % |
| --- | --- |
| Sodium tripolyphosphate | 25.0 |
| Sodium carbonate | 25.0 |
| $C_{12}$-$C_{15}$ linear alcohol ethoxylate with 7 moles of EO | 1.0 |
| Polymer of Example 3 | 1.0 |
| Sodium sulfate | balance |

Example 17

Floor Polish

| Ingredients | Weight % |
| --- | --- |
| Syncrowax HGL | 4.0 |
| Crosterene | 2.7 |
| Silicone fluid (500 cs) | 3.0 |
| DI water | 89.0 |
| Polymer of Example 4 | 5.0 |

Example 18

Liquid Hand Soap

| Ingredient | Weight % |
| --- | --- |
| Distilled palm kernel fatty acids | 9.0 |
| Tallow fatty acids | 3.0 |
| Crodalan LA 1010 (cetyl acetate (and) acetylated lanolin alcohol, Croda, Yorkshire, England) | 1.5 |
| Na Lauryl sulfate | 6.0 |
| Morpholine | 5.0 |
| Polymer of Example 2 | 0.5 |
| Water | Balance |

Example 19

Paper Coating Composition

| Ingredient | Weight % |
|---|---|
| Predispersed clay | 15 |
| Precipitated calcium carbonate | 15 |
| Ground calcium carbonate | 15 |
| Sodium polyacrylates as dispersing agent | 0.2 |
| Oxidized starch | 5 |
| Styrene-butadiene latex | 12 |
| Polymer of Example 1 as opacifier | 0.5 |
| Water | Balance |

Although the present invention has been described and illustrated in detail, it is to be understood that the same is by way of illustration and example only, and is not to be taken as a limitation. The spirit and scope of the present invention are to be limited only by the terms of any claims presented hereafter.

We claim:

1. A self-stabilizing dispersion copolymer comprising:
   at least one polymerizable acid-containing moiety, wherein the at least one acid-containing moiety is at least partially neutralized before or during polymerization, and
   at least one hydrophobic moiety,
   wherein the copolymer provides opacity to aqueous formulations.

2. The self-stabilizing dispersion composition of claim 1 wherein the at least one polymerizable acid-containing moiety is selected from the group consisting of acrylic acid, methacrylic acid, ethacrylic acid, α-chloro-acrylic acid, α-cyano acrylic acid, β-methyl-acrylic acid (crotonic acid), α-phenyl acrylic acid, β-acryloxy propionic acid, sorbic acid, α-chloro sorbic acid, angelic acid, cinnamic acid, p-chloro cinnamic acid, β-styryl acrylic acid (1-carboxy-4-phenyl butadiene-1,3), itaconic acid, citraconic acid, mesaconic acid, glutaconic acid, aconitic acid, fumaric acid, tricarboxy ethylene, 2-acryloxypropionic acid, 2-acrylamido-2-methyl propane sulfonic acid, vinyl sulfonic acid, vinyl phosphonic acid, sodium methallyl sulfonate, sulfonated styrene, allyloxybenzene sulfonic acid, maleic acid, maleic anhydride and combinations thereof.

3. The acid-containing moiety of claim 2, wherein the moiety is acrylic acid, methacrylic acid, maleic acid, itaconic acid or mixtures thereof.

4. The self-stabilizing dispersion composition of claim 1 wherein the at least one hydrophobic moiety is prepared from at least one hydrophobic monomer.

5. The at least one hydrophobic monomer of claim 4 is selected from the group consisting of styrene, α-methyl styrene, 2-ethylhexyl acrylate, octyl acrylate, lauryl acrylate, stearyl acrylate, behenyl acrylate, 2-ethylhexyl methacrylate, octyl methacrylate, lauryl methacrylate, stearyl methacrylate, behenyl methacrylate, 2-ethylhexyl acrylamide, octyl acrylamide, lauryl acrylamide, stearyl acrylamide, behenyl acrylamide, propyl acrylate, butyl acrylate, pentyl acrylate, hexyl acrylate, 1-vinyl naphthalene, 2-vinyl naphthalene, 3-methyl styrene, 4-propyl styrene, t-butyl styrene, 4-cyclohexyl styrene, 4-dodecyl styrene, 2-ethyl-4-benzyl styrene, 4-(phenyl-butyl) styrene andor combinations thereof.

6. The at least one hydrophobic monomer of claim 4 is selected from the group consisting of siloxane, saturated or unsaturated alkyl, and alkoxy group, aryl and aryl-alkyl group, alkyl sulfonate, aryl sulfonate and combinations thereof.

* * * * *

UNITED STATES PATENT AND TRADEMARK OFFICE
CERTIFICATE OF CORRECTION

PATENT NO. : 7,875,359 B2  
APPLICATION NO. : 11/035160  
DATED : January 25, 2011  
INVENTOR(S) : Klein A. Rodrigues and Darin K. Griffith Page 1 of 1

It is certified that error appears in the above-identified patent and that said Letters Patent is hereby corrected as shown below:

Col. 18, line 29, change "andor" to --and--

Signed and Sealed this  
Third Day of May, 2011

David J. Kappos  
*Director of the United States Patent and Trademark Office*